United States Patent [19]
Spitzenberger et al.

[11] Patent Number: 5,930,209
[45] Date of Patent: Jul. 27, 1999

[54] OPTICAL DISC WITH SECTOR ADDRESS IRREGULARITIES TO PREVENT COPYING, AND APPARATUS FOR RECORDING AND DETECTING SUCH COPY PROTECTION

[75] Inventors: Uwe Spitzenberger, Hanover, Germany; Louis M. H. Faessen, Venlo, Netherlands

[73] Assignee: U.S. Philips Corporation, New York, N.Y.

[21] Appl. No.: 08/899,948

[22] Filed: Jul. 24, 1997

[30] Foreign Application Priority Data

Jul. 24, 1996 [EP] European Pat. Off. .............. 96202110

[51] Int. Cl.$^6$ .................................................. G11B 17/22
[52] U.S. Cl. .................................. 369/32; 369/47; 369/58
[58] Field of Search ................................ 369/32, 14, 58, 369/47, 48, 54, 59, 13, 44.27, 44.29, 116

[56] References Cited

U.S. PATENT DOCUMENTS 5,255,007  10/1993  Bakx ........................................ 346/1.1
5,661,703   8/1997  Moribe et al. ............................ 369/14

*Primary Examiner*—Ali Neyzari
*Attorney, Agent, or Firm*—Leroy Eason

[57] ABSTRACT

An optical disc and an optical disc recording apparatus have an improved protection against undesired or illegal copying. Information on optical discs is arranged in sectors, which each has an address label. The address value of the address labels increases linearly from the start of the disc or from the start of the program area of the disc. The address labels of specific sectors, which may have an informationless content, are given different, e.g zero, address values, which prevent copying CD-ROM discs on a standard CD-Recorder apparatus. Said address labels may be stored in the main data stream or e.g. the subcode channel of a CD system.

11 Claims, 8 Drawing Sheets

Layout of copy-protected CD-ROM

| Address | Sector | Track | Index | Content | Comments |
|---|---|---|---|---|---|
| 00:00:00 | | 1 | 0 | Zeros | Start of 150 sectors Pregap |
| 00:00:01 | | 1 | 0 | Zeros | |
| 00:00:02 | | 1 | 0 | Zeros | |
| ---- | | 1 | 0 | Zeros | |
| 00:00:74 | | 1 | 0 | Zeros | |
| 00:01:00 | | 1 | 0 | Zeros | |
| 00:01:01 | | 1 | 0 | Zeros | |
| 00:01:02 | | 1 | 0 | Zeros | |
| ---- | | 1 | 0 | Zeros | |
| 00:01:73 | | 1 | 0 | Zeros | |
| 00:01:74 | | 1 | 0 | Zeros | |
| 00:02:00 | 0 | 1 | 1 | Zeros | First reable sector on CD-ROM |
| 00:02:01 | 1 | 1 | 1 | Zeros | |
| 00:02:02 | 2 | 1 | 1 | Zeros | |
| ---- | | 1 | 0 | Zeros | |
| 00:02:15 | 15 | 1 | 1 | Zeros | |
| 00:02:16 | 16 | 1 | 1 | PVD | Primary Volume Descriptior |
| 00:02:17 | 17 | 1 | 1 | PVD | Primary Volume Descriptior |
| 00:02:18 | 18 | 1 | 1 | Zeros | No reference to these sectors |
| ---- | | 1 | 0 | Zeros | in the directory of the CD-ROM |
| 00:02:24 | 24 | 1 | 1 | Zeros | |
| 00:02:25 | 25 | 1 | 1 | Zeros | |
| 00:02:26 | 26 | 1 | 1 | Zeros | |
| 00:00:00 | 27 | 1 | 1 | Zeros | Address 00:02:27 missing |
| 00:00:00 | 28 | 1 | 1 | Zeros | Address 00:02:28 missing |
| 00:00:00 | 29 | 1 | 1 | Zeros | Address 00:02:29 missing |
| 00:02:30 | 30 | 1 | 1 | Zeros | |
| 00:02:31 | 31 | 1 | 1 | Zeros | |
| 00:02:32 | 32 | 1 | 1 | Zeros | |
| ---- | | 1 | 0 | Zeros | |
| 00:02:73 | 73 | 1 | 1 | Zeros | No reference to these sectors |
| 00:02:74 | 74 | 1 | 1 | Zeros | in the directory of thr CD-ROM |
| 00:03:00 | 75 | 1 | 1 | Data | User data |
| 00:03:01 | 76 | 1 | 1 | Data | User data |
| 00:03:02 | 77 | 1 | 1 | Data | User data |
| 00:03:03 | 78 | 1 | 1 | Data | User data |
| ---- | | 1 | 1 | Data | User data |
| 78:59:73 | 355348 | 1 | 1 | Data | User data |
| 78:59:74 | 355349 | 1 | 1 | Data | User data |
| 79:00:00 | 355350 | 1 | 1 | Zeros | Postgap |
| ---- | | 1 | 1 | Zeros | Postgap |
| 79:01:74 | 355499 | 1 | 1 | Zeros | Postgap |
| 79:02:00 | 355500 | AA | | Zeros | Start Leadout, End of CD |

ADD ↑  SN  TNO ↑  ↑INDEX

FIG. 7

OPTICAL DISC WITH SECTOR ADDRESS IRREGULARITIES TO PREVENT COPYING, AND APPARATUS FOR RECORDING AND DETECTING SUCH COPY PROTECTION

FIELD OF THE INVENTION

This invention relates to the fields of software copy protection and to magnetic, optical, and magneto-optical data storage.

BACKGROUND OF THE INVENTION

The invention relates to disc recording apparatus for recording digital data on an optically readable disc. The invention further relates to optically readable discs on which such digital data have been recorded, and playback apparatus for such discs.

A system using an optically readable digital audio disc (referred to as a compact disc) is a disc system which can reproduce high quality stereophonic musical sounds. Such system is known from the International Standard IEC 908: "Compact Disc Digital Audio System". Digital data such as data representative of characters, display data, program software, computer data, images, etc. other than stereophonic musical sounds can be stored on and reproduced by such a disc system without markedly modifying the arrangement of the player for such disc. A playback apparatus for reproducing visual information such as charts and statistics using graphics, pictorial illustration using still pictures, and a video game apparatus by adding a display unit, have been realized thereby providing a wide range of use for a compact disc system. The data memory capacity of the current compact disc is about 640 Mbytes, and therefore, a compact disc has a very large advantage as compared with the memory capacity of a standard flexible disc. Such CD systems are known as the CD-ROM system and are known amongst others form the ECMA standard—130 and 168 respectively: "Data Interchange on Read Only 120 mm Optical Data Disks (CD-ROM)" and "Volume and File Structure of Read only and Write Once Compact Disc Media for Information Exchange" respectively. U.S. Pat. No. 5,255,007 describes adjustment parameters for magnetic or magneto-optical recording.

The above citations are hereby incorporated in whole by reference.

SUMMARY OF THE INVENTION

A drawback of the optically readable discs is that they can be copied easily. Although there is a copy protect bit used in each group of frames of a CD-Audio disc in the subcode channel, still undesired copying is possible, because this bit has a fixed repetitive position in the bitstream provided by the output of the decoder in a CD-player, and thus can easily be "overruled". Further, software programs for PC applications etc. are distributed by use of CD-ROM discs in vast amounts. Here again it is highly desirable that copying can not be done without permission/authorization. Also a lot of other formats of optically readable discs are gaining commercial interest and thus anti-copy measures are gaining commercial interest and thus anti-copy measures are highly desirable.

It is an object of the invention to provide an optically readable disc, which has an improved protection against undesired or illegal copying by use of an optical disc recording apparatus. It is a further object of the invention to provide an optically readable disc for any type of compact disc system, which has an improved protection against undesired and or illegal copying of such discs by use of CD-recording apparatus, which are already available in the market.

It is another object of the invention to provide an optical disc recording apparatus, which has an improved capability to prevent undesired and or illegal copying of optically readable discs in addition to the todays anti copy mechanisms.

According to a first aspect of the invention there is provided an optically readable disc comprising digital data arranged in sectors corresponding to a unit of organisation of the digital data, each sector being accessible via an address label stored with said sector. The address label has an address value increases with each successive sector except for at least one address label, which has an address value different from the increasing address value. This has the advantage, that such address values cannot be created using a standard optical recording apparatus.

A preferred embodiment of the optically readable disc, wherein the digital data comprises digital mainstream data and digital subcode data, is characterized in that the address label having said different address value is stored in the digital subcode data. This is advantageous in that the subcode data cannot be controlled directly by a standard recording apparatus.

A further embodiment of the optically readable disc is characterized in that the address label having said different address value is stored with a sector containing informationless data. This has the advantage, that no special reading device is needed for reading the sectors having the different address values.

A further embodiment of the optically readable disc is characterized in that said different address value is a zero address value.

A further embodiment of the optically readable disc is characterized in that a plurality of successive address labels have said different address value.

A further embodiment of the optically readable disc, wherein the sectors are arranged in a program area starting with a pregap comprising sectors with informationless data, is characterized in that at least one address label having said different address value, is arranged in the pregap.

A further embodiment of the optically readable disc, wherein the sectors are arranged in a program area preceded by lead-in area and succeeded by a lead-out area, is characterized in that at least one address label having said different address value is arranged in the lead-in area and/or the lead-out area.

A further embodiment of the optically readable disc is characterized in that at least one address label which has said different address value is arranged preceding or succeeding a sector storing copy-protectable information.

A further embodiment of the optically readable disc, on which the digital data is stored according to predetermined modulation and error correction rules, is characterized in that at least one sector comprises at least one error effected by violating the predetermined modulation and error correction rules.

According to a second aspect of the invention there is provided an optical disc recording apparatus for recording digital data on an optically readable disc, the digital data being arranged in sectors and each sector being addressable via an address label, which address label has an address value increasing with each successive sector, characterized in that the optical disc recording device comprises reading means for reading address labels, detection means for detection of an address label, which has a address value different from the increasing address value relative to the address value of the preceding address label, and abortion means for aborting the recording of digital data upon detection of said address label, which has said different address value.

According to a third aspect of the invention there is provided an optical disc playback apparatus for retrieving digital data from an optically readable disc, the digital data being arranged in sectors and each sector being addressable via an address label, characterized in that such apparatus comprises verification means for verifying that at least one address label has an address value different from the increased address value which normally follows the address value of the preceding address label, and abortion means for aborting the playback of digital data dependent upon such verification.

Those skilled in the art will understand the invention and additional objects and advantages of the invention by studying the description of preferred embodiments below with reference to the following drawings which illustrate every feature of the appended claims:

BRIEF DESCRIPTION OF THE DRAWINGS

The invention will be illustrated, by way of an example, with reference to

FIG. 7 shows in a matrix a schematic diagram a table of addresses, sector numbers, tracks and content of CD-ROM disc as a function of time in accordance with the invention;

DETAILED DESCRIPTION OF THE PREFERRED EMBODIMENT

Figure 1:
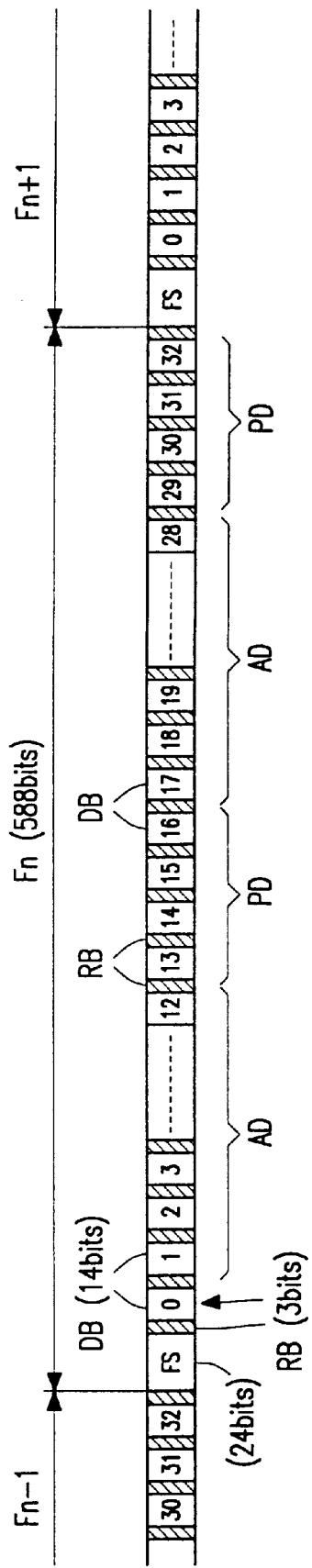
FIGS. 1 and 2 are schematic diagrams which are used to describe the data arrangements of the recorded data of a compact disc to which this invention is applied.

FIG. 1 shows that a data stream is recorded on a compact disc as a series of frames. Each frame Fn consists of 588 bits of recorded data, and has at its head a frame sync pulse FS having a specific bit pattern. The frame sync pulse FS is followed by a 3-bit DC-restriction word RB. Thereafter, the 0th–32nd data words DB each having 14 bits and the 3-bit DC-restriction words RB are further recorded alternately. The 0th words among these data words DB are subcode data (or so-called user bytes) of a subcode signal which is used to control the playback of a disc and to display the relevant information or the like. In the audio disc format, the 1st to 12th and 17th to 28th data words DB are assigned for audio data in the main channel. The remaining 13th to 16th and 29th to 32nd data words DB are assigned for parity data of the error correction code in the main channel. Each of the data words DB consists of 14 bits into which 8-bit data word has been converted by a 8 to 14 conversion upon recording.

Figure 2:
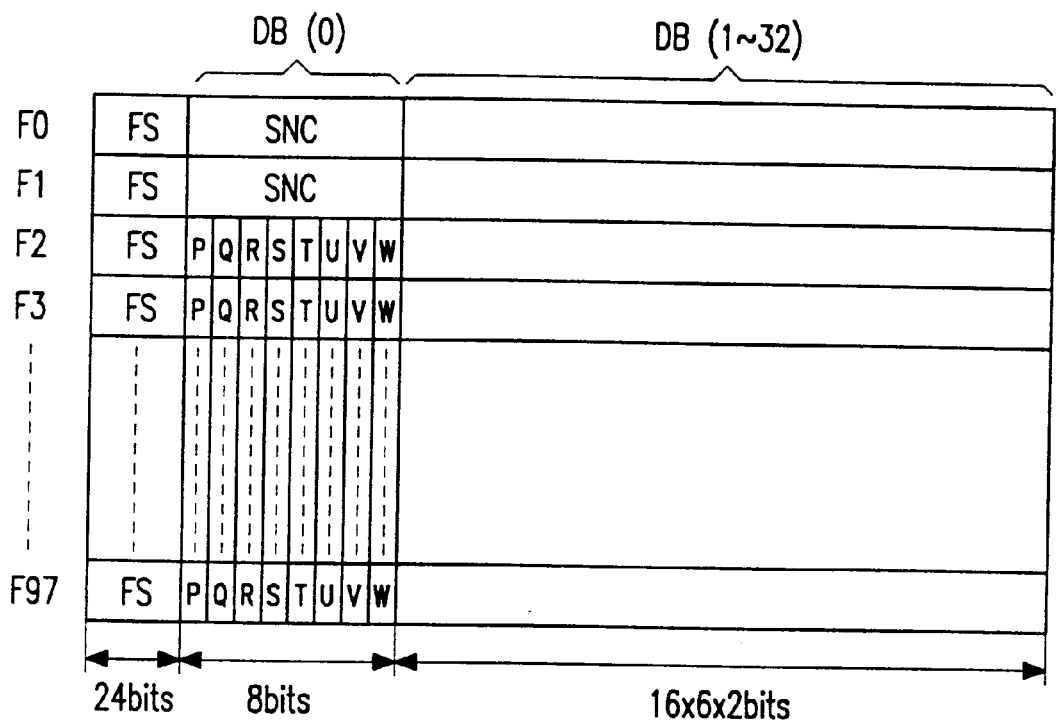

FIG. 2 shows the state of data in one group of the frames (98 frames), with the 98 frames arranged sequentially in parallel. In FIG. 2, each of the data words DB is represented by 8 bits and the DC-restriction words RB are excluded. The subcode signal data P to W in the 0th and 1st frames form the sync patterns which are predetermined bit patterns. For the Q channel, the CRC codes for error detection are inserted in the latter 16 frames among the 98 frames.

The P-channel signal is a flag to indicate a music program and a pause. With music recorded in audio disc format, this signal in the P-channel has a lower level throughout the duration of a music program and a higher level throughout the duration of a pause, and has pulses of 2-Hz period in the lead-out section. It is possible to select and play back the specified music program by detecting and counting this signal in the P channel. The Q channel enables more complicated control of this type. For example, when the Q-channel information is stored in a microcomputer in the disc playback apparatus, it is possible to shift quickly from one music program to another during the playback of a music program; thus, respective ones of the recorded music programs may be selected at random. The other R through W channels can be used to indicate an author or composer, an explanation, poetry, or the like for the music programs recorded on the disc.

Among the 98 bits in the Q channel, the first two bits are used for a sync pattern; the next four bits for control bits; then the next four bits for address bits; the following 72 bits for data bits; and at last a CRC code for error detection is added. A track number code TNR and an index code X are included in the 72 bits allotted to the data bits. The track number code TNR can be varied from 00 to 99, and the index code X can be likewise changed from 00 to 99.

Furthermore, the data in the Q channel contains a time indication code representative of the time durations of music programs and pauses, and a further time indication code indicative of an absolute time duration that continuously changes from the beginning to the end at the most outer rim side of the program area of the compact disc. These time indication codes comprise codes indicating minute, second and frame which each consist of two digits. One second is divided into 75 frames. In order to access digital data from the compact disc on a shorter unit basis than a music unit, the time indication code with respect to the above-mentioned absolute time duration is used in this embodiment of the present invention.

Figure 3:
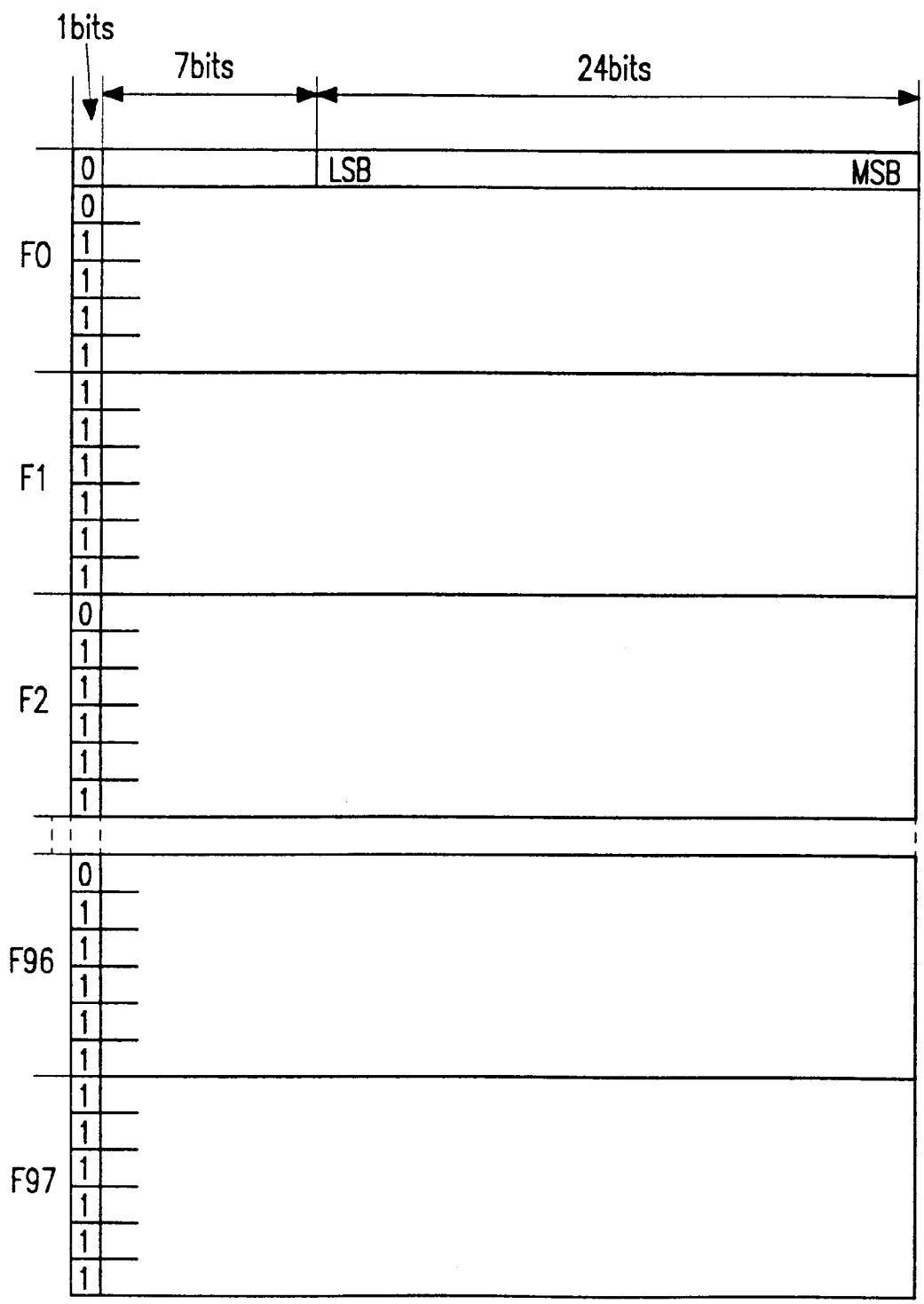
FIG. 3 is a schematic diagram showing the arrangement of one block of the digital main data in one embodiment of this invention.

FIG. 3 illustrates an arrangement of digital signals other than stereophonic musical signals from the compact disc in an embodiment of the present invention. As described above, the subcode signal for a compact disc is organised in units of 98 frames. In this embodiment of FIG. 3, one block of the main data is constituted by the length of 98 frames corresponding to the same group of the 0th to 97th frames. In the audio disc format, one frame includes the digital audio data consisting of 12 words each of 16 bits, and so 24-byte digital main data can be inserted in one frame. Referring to FIG. 3, one row contains total 32 bits of one sample in the L channel of the audio data and one sample in the R channel thereof, and each frame consists of six such rows.

In the embodiment of FIG. 3, a one-bit sync bit is added to the head of each 32-bit row of the block. In the 0th frame Fo the sync bits at the respective heads of the first 32 bits and the next 32 bits are zero. The sync bits in each head of the respective first 32 bits in the frames bearing even numbers except the 0th frame are zero, while the sync bits in each head of the respective first 32 bits in the frames bearing odd numbers are one. These sync bits enable the detection of the head location of the block on a 98-frame unit basis.

The above-mentioned one block consists of (24 bytes× 98=2352 bytes). The data of 2 Kbytes (2048 bytes) is inserted in one block, and 304 bytes (2432 bits) remain. (6×98=588 bits) are used as sync bits. A 7-bit mode signal and a 24-bit address signal are inserted in the first 32 bits in the 0th frame, so that 1813 bits still remain in one block. These 1813 bits can be assigned to redundant bits when the error correction coding processing is performed for the data of one block.

The mode signal serves to specify the kind of data in that block. For example, the mode signal is used to discriminate character data, still picture data and program code. The address signal serves to specify the data in the block. Furthermore, the reason why the sync bits of the frame bearing even numbers are set to zero is that the present embodiment of the invention takes account of an arrangement of data blocks on a two-frame unit basis. For the case of a block having a size of two frames, a mode signal and an address signal are added to each block. In the case of the block having a length of 98 frames as in the FIG. 3 embodiment of this invention, the codes for indicating the P data and the absolute time durations of the Q data in the subcode signals in the same block are identical.

The digital signals in the block format shown in FIG. 3 can be recorded on a compact disc in the same manner as an audio compact disc. That is, a digital signal to be recorded is supplied to a digital input terminal of a digital audio processor and this digital signal is converted into a video signal format, thereby recording it using a VTR system of the rotary head type. In this case, TOC (table of contents) data to generate a subcode signal is preliminarily recorded in the audio track in the starting edge section on a magnetic tape on which this digital signal will be recorded. Next, the TOC data reproduced from this magnetic tape is supplied to a subcoding generator, and the reproduced digital signal is supplied to an encoder, and the subcode signal is further supplied to this encoder, then a laser beam is modulated on the basis of an output of the encoder. A master disc is made by means of this modulated laser beam.

As another method of recording a digital signal, the data stored on, for example, a hard disc memory that can be accessed at a high speed is accessed by a minicomputer, and a digital signal is supplied in real time to an encoder of a cutting system.

Figure 4:
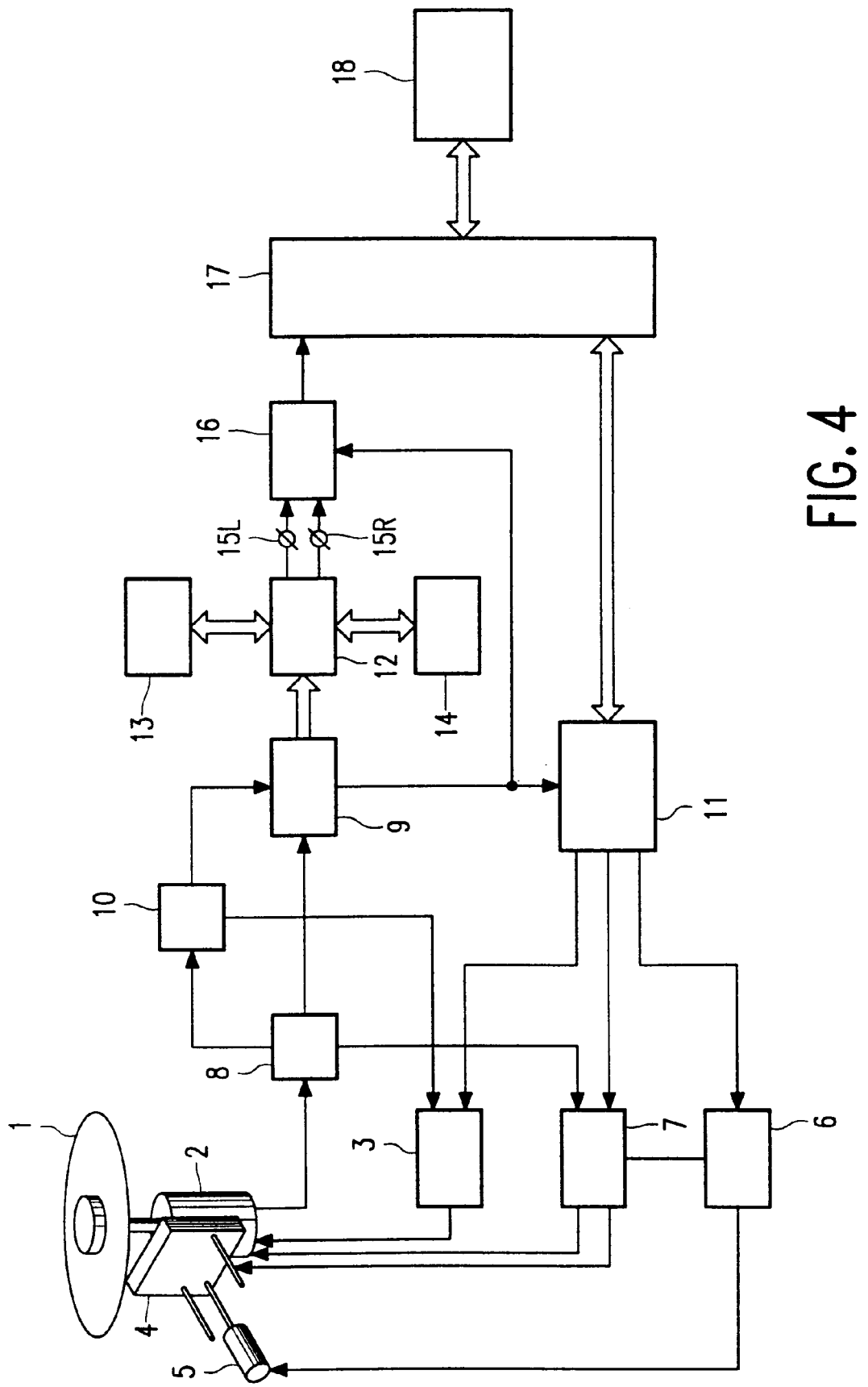
FIG. 4 is a block diagram of apparatus in accordance with this invention.

FIG. 4 shows a playback apparatus in accordance with this invention. In FIG. 4, reference numeral 1 denotes a compact disc on which a digital signal of the above-described format has been spirally recorded. The compact disc 1 is rotated by a spindle motor 2. In this case, the spindle motor 2 is controlled by a spindle servo circuit 3 so that the compact disc 1 rotates at a constant linear velocity.

Reference numeral 4 indicates an optical head, which has a laser source for generating a laser beam for pickup, a beam splitter, an optical system such as an objective lens or the like, and a photoreceptive device for receiving the reflected laser beam from the compact disc 1, etc. The optical head 4 can be moved in the radial direction of the compact disc 1 by the thread feed motor 5. The thread feed motor 5 is driven by a thread drive circuit 6. The optical head 4 can be deflected both in the direction perpendicular to the signal surface of the compact disc 1 and in the direction parallel thereto, and it is controlled so that the focusing and tracking of the laser beam upon playback are always properly performed. For this purpose, a focusing and tracking servo circuit 7 is provided.

A reproduction signal from the optical head 4 is supplied to an RF amplifier 8. The optical head 4 is provided with a focus error detecting section consisting of a combination of, for example, cylindrical lens and 4-dividing detector, and a tracking error detecting section using three laser spots. This servo error signal is supplied to a focusing and tracking servo circuit 7. An output signal of the RF amplifier 8 is supplied to a digital demodulator 9 and a bit clock reproduction circuit 10. The digital signal recorded on the compact disc 1 has been EFM modulated. The EFM modulation is a method of block-converting 8-bit data into a preferable 14-bit (i.e. 14 bits such as to provide a long minimum inverting time period of the modulated signal and reduce it's low-frequency component) pattern. The digital demodulator 9 is constituted in such a manner as to carry out the demodulation of EFM. The bit clock fetched by a bit clock reproduction circuit 10 is supplied to the digital demodulator 9 and the spindle servo circuit 3.

The subcode signal is separated by the digital demodulator 9 and this separated subcode signal is supplied to a system controller 11. The system controller 11 is equipped with a CPU, and the rotating operation of the compact disc 1, the thread feeding operation, the reading operation of the optical head 4, or the like are controlled by the system controller 11. Control commands are supplied to the system controller 11 through an interface 17, that will be described later. Namely, the reading operation of a desired digital signal from the compact disc 1 using the subcode signal is controlled by the system controller 11.

The main digital data output from the digital demodulator 9 is supplied through a RAM controller 12 to RAM 13 and an error correction circuit 14. The processing with respect to the elimination of variation of the time base, error correction and error interpolation are carried out by the RAM controller 12, RAM 13 and error correction circuit 14, so that the digital main data is fetched from terminals 15L and 15R. In the case of playback of a compact disc on which only audio data has been recorded, D/A converters would be connected to these terminals 15L and 15R, respectively. In the case of FIG. 4, no D/A converter is provided to fetch the digital data from the outputs, and the reproduced digital data is supplied to a data converter 16. The reproduced subcode signal is also supplied to this data converter 16, and the reproduced data is converted into the form of a serial signal.

This serial signal is supplied to the interface 17, and the data for the system controller 11 is supplied from a microcomputer system 18 through the interface 17 to the controller 11. The microcomputer system 18 specifies a readout address and applies control signals such as start signals in addition to this readout address to the interface 17 and system controller 11. A list of a plurality of record areas has been recorded in the lead-in track in the most inner rim section on the compact disc 1 using the subcode signal as addresses. This list is reproduced in the initial state to start the readout of the compact disc 1 and is read by the microcomputer system 18.

Figure 5:
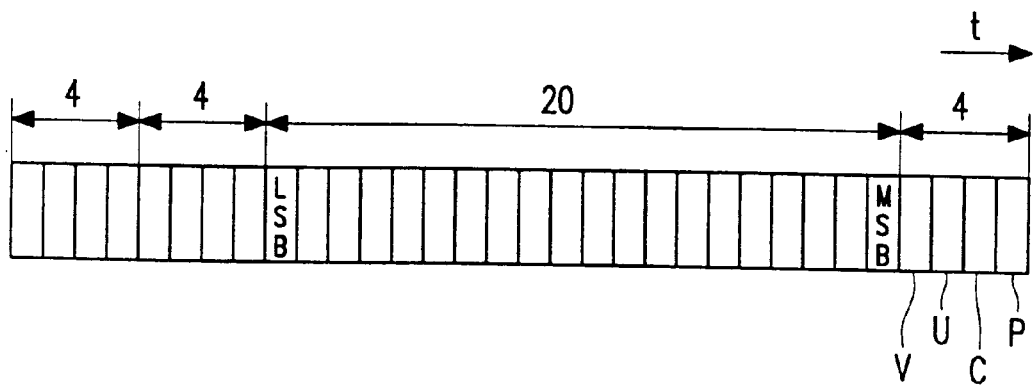
FIG. 5 is a schematic diagram showing a word format of serial data produced in this apparatus.

FIG. 5 shows an example of the word format of the serial signal output from the data converter 16. For this serial signal, one word consists of 32 bits; the first four bits are for preamble; next four bits for auxiliary bits of the audio data; and next 20 bits for digital audio sample. In the case where the digital audio sample consists of 16 bits, 16 bits from the least significant bit (LS8) are inserted. Four bits are added after the digital audio sample. Among these four bits, the first bit indicated by V is a flag to show whether the digital audio sample of that word is effective or not; bit U is each bit of the subcode signal; bit C is a bit to identify the channel; and bit P is a parity bit. This bit U of the subcode signal is inserted into each word format one bit by one and these inserted bits are sequentially transmitted.

In one embodiment of the present invention, a read instruction to a predetermined address is first executed by the microcomputer system 18. This address is a code itself for indicating an absolute time duration in the Q channel and is supplied through an interface 17 to the system controller 11. The system controller 11 controls the thread drive circuit 6 to move the optical head 4 to the location near a desired pickup location while supervising the subcode signal reproduced by the optical head 4. In this example, therefore, the reproduction is started from the location spaced a few blocks apart to prevent a malfunction due to the access operation being not finished if an error occurred in the reproduced subcode signal and the set subcode signal is not reproduced. The desired block is caught by detecting the coincidence of the reproduced subcode signal with the designated address, or by starting the playback from the location near the correct subcode signal and then counting the frame sync signals.

Figure 6:
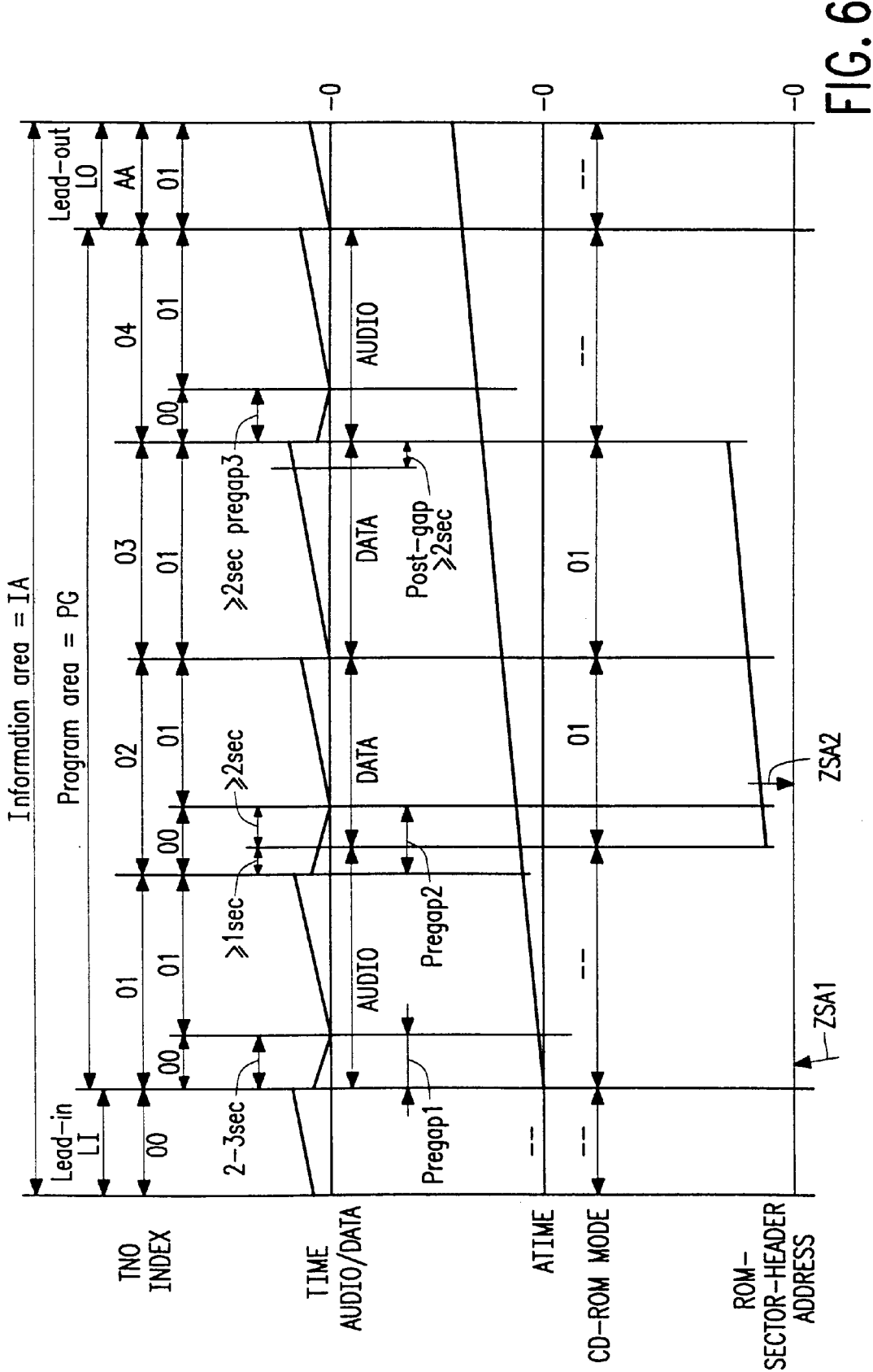
FIG. 6 shows a schematic diagram of the layout of a CD-ROM disc in accordance with the invention as a function of time.

In FIG. 6 a schematic layout of a CD-ROM disc in accordance with the invention has been shown. Reference is made herewith to the ECMA-Standard 130 (CD-ROM-Standard) Section IV: Recording, which is incorporated in here for purpose of reference.

The information area IA on a disc comprises at least a lead-in area LI, a program area PG and a lead-out area LO. The track number TNO, which is recorded in the Q-channel of the subcode channel, has the value OO and AA respectively for the lead-in area LI and the lead-out area LO respectively.

The program area PG has been divided in a plurality of tracks. In this example the CD-ROM disc comprises CD-Audio tracks as well as CD-ROM data tracks. The four tracks as shown have the successive track numbers, 01, 02, 03 and 04 and are an audio track, a ROM track, a ROM track and an Audio track respectively. The index belonging to track number TNO, each time has the value 00 during a pregap, which comprises informationless data e.g. the value 00 (in Hexadecimal notation). The index has the value 01 during the groups of frames (sectors) comprising information such as audio or ROM DATA.

In the subcode data time references have been recorded. A first time reference TIME relates to the information in the track. Each time at the start of the information in a track the time reference TIME starts at a value zero and increases linearly with the successive groups of frames in a track. Further the time reference TIME starts at a certain value at the start of a pregap and decreases linearly with the successive groups of frames, which comprise informationless data (e.g. "digital silence"), and ends at the value zero at the end of the pregap.

Further an absolute time code ATIME has been recorded in the Q channel of the subcode data. This absolute time code ATIME has a zero value at the beginning of the program area PG and increases linearly with the groups of frames in the program area PG. In accordance with a first embodiment of the invention in the pregap 1 there have been recorded absolute time codes that do not comply with the linear increasing values of ATIME, e.g. the value zero can be recorded as indicated by zero sector address ZSA1.

The ROM data in the CD-ROM tracks (TNO=02 or TNO=03) are accessible by address labels that have been recorded in the main stream data. These ROM-Sector Header Addresses have the same value as the absolute time code ATIME in the Q channel corresponding to the same sectors (groups of frames) as shown in FIG. 6. In another embodiment of the invention certain ROM Sector Header Addresses have been set to zero beyond pregap 2, TNO=02; INDEX=01. Again this is a violation of the linearly increasing absolute time code ATIME and the ROM Sector Heading Addresses corresponding therewith.

In FIG. 7 a table of sector addresses ADD, sector numbers SN, track numbers TNO, index numbers INDEX and content has been shown. The sector address 00:00:00 first occurring is the very first address of the Program Area PG (see FIG. 6). The sector addresses ADD increase linearly during the 150 sectors of the pregap. (from 00:00:00 to 00:00:74 for the first 75 sectors and from 00:01:00 to 00:01:74 for the second 75 sectors). The first part of the CD-ROM track 1 comprises sectors, which may comprise information, starting at sector SN=0 at address 00:02:00. In accordance with the invention sectors 27, 28 and 29 each have an address ADD equal to 00:00:00, which violates the linear increasing sequence of addresses. The content of the sectors 27, 28, 29 are informationless. These sectors 27, 28 and 29 have been preceded by sectors that do have information, e.g. sectors 16 and 17 contain the Primary Volume descriptor for this CD-ROM discs. The sectors SN=18 to SN=74 do not have information and are not referred to in the directory of the CD-ROM. Sector SN=75 and succeeding sectors up to 355.349 provide the CD-ROM user data, which end at the postgap of sectors 355.350 to 355.499. The next sector is the start of the lead-out area, which is shown by track number TNO=AA.

Figure 8:
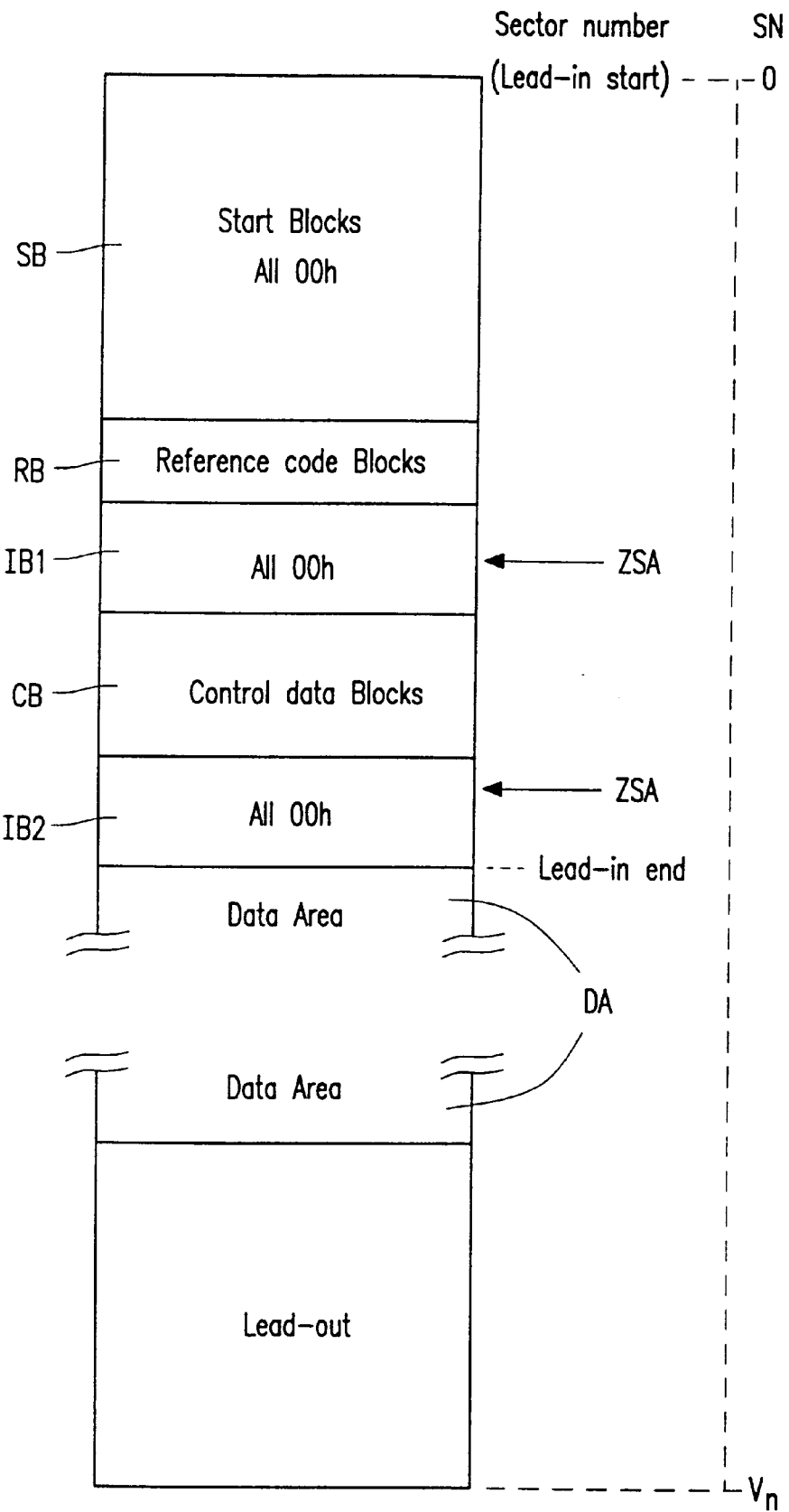
FIG. 8 shows a schematic diagram of the layout of the sector organisation of another optical disc in accordance with the invention.

In FIG. 8 another embodiment of a layout of an optically readable disc in accordance with the invention has been shown. The disc shows an information area, a lead-in area and a lead-out area. The lead-in area comprises several blocks, each comprising the same number of sectors (e.g. a block comprises 16 sectors). A number of Start Blocks SB all comprise informationless data. Reference code blocks RB may comprise information for error correction of the Start Blocks SB. Intermediate Blocks IB1 again may comprise informationless data. In a next part of the Lead-In Area several control blocks CB are present, which may comprise information about the disc, discmanufacturer etc. Intermediate Blocks IB2 follow the Control Blocks CB, precede the Data Area DA and comprise informationless sectors. Sector number addresses start with address SN=0 at start of the lead-in area and end with address SN=n for the last sector of the lead-out area. The sector addresses increase linearly from 0 to n for each sector therebetween, except for a few sectors in e.g. intermediate blocks IB1 or IB2. These few sectors have sector address labels, which have an address value different from the increasing value, e.g. a zero address value. As a result undesired copying is prevented.

It should be emphasized that the sector addresses, which should violate the linear increasing sequence of the address values can be arranged at random in the specified areas, so as to increase the threshold of undesired/illegal copying of discs.

Figure 9:
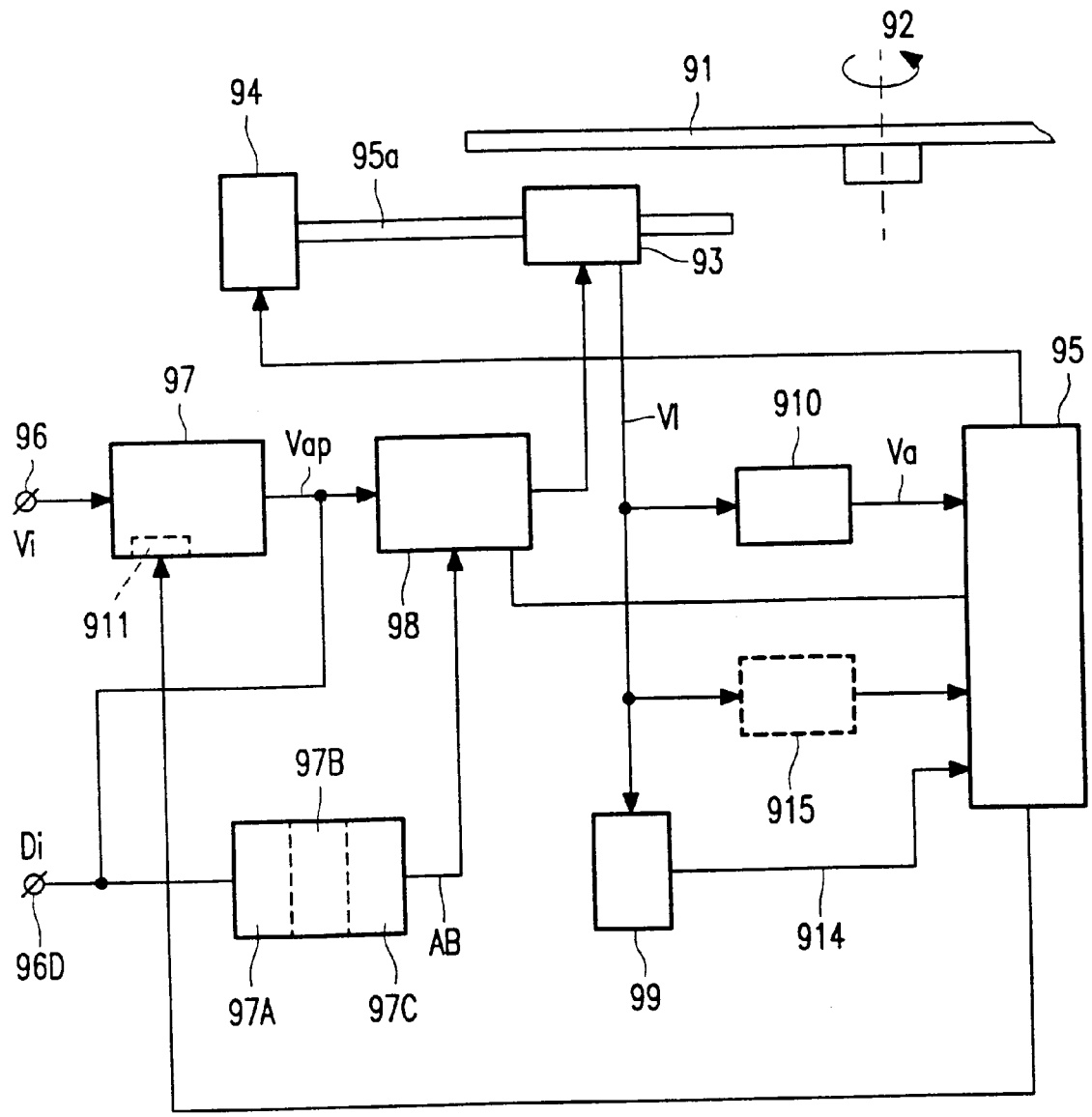
FIG. 9 shows schematically an optical disc recording apparatus in accordance with the invention.

FIG. 9 by way of example shows an embodiment of an information recording device in accordance with the invention. The present embodiment is a recording device by means of which information can be recorded on a record carrier 91, for example an optical record carrier, which is rotated about an axis 92. The information recording device comprises a customary read/write head 93, arranged opposite the rotating record carrier 91. By means of a customary positioning system for example in the form of a motor 94 and a spindle 95a, the read-write head 93 can be moved in a radial direction relative to the record carrier 91 under control of a customary control unit 95, which comprises for example a microprocessor.

An information signal Vi to be recorded can be applied to a signal processing circuit 97 via an input 96. The signal processing circuit 97 is of a customary type, which converts the applied input signal into a recording signal Vop is applied to a driver circuit 98 of a customary type, which converts the recording signal Vop into a drive signal Vs for the read/write head 93 in such a way that an information pattern corresponding to the recording signal Vop is recorded on the record carrier. For the purpose of reading the recorded information patterns the read/write head 93 has an output for supplying a read signal V1 which is representative of the information pattern being read. The read signal V1 is applied to a read circuit 99 for recovering the information presented by the read signal V1. The recorded address labels may be read by read circuit 99 or optionally by a separate address read circuit 915. The driver circuit 98 is of an adjustable type, enabling one or more of the parameters with which the quality of the recorded information pattern can be influenced to be adjusted. When an optical read/write head is used by which an information pattern of optically detectable effects is formed by means of a radiation beam, the intensity of the radiation beam is an important parameter which largely dictates the quality of the information pattern. If the read/write head is a magnetic or magneto-optical write head which generates a magnetic field for the purpose of forming an information pattern in the form of magnetic effects (domains), the field strength of the generated magnetic field may be an important adjustment parameter. If the information patterns is formed by means of write pulses the pulse width may be an important adjustment parameter. It is to be noted that the above-mentioned adjustment parameters are only few examples of the large number of adjustment parameters which are possible. In this respect reference is made in particular to NL-A-9000150 (PHN 13.217), which corresponds to U.S. Pat. No. 5,255,007, in which the adjustment parameter is a reference value for the speed with which the effects are formed at the adjusted reference value.

For determining the optimum setting of the driver circuit 98 the device comprises an analysis circuit 910, which derives from the read signal an analysis signal Va which is indicative of the quality of the information pattern being read. The optimum setting can be determined in a calibration procedure by forming test information patterns for different settings of the driver circuit on the record carrier 91 and by selecting on the basis of the analysis signal Va that setting for which the analysis signal indicates an optimum quality. In principle, the information signal Vi may be employed for writing the test information pattern. However, it is also possible to employ a test signal generator 911 for this purpose, which may then be included, for example, in the signal processing circuit 97. The optimum setting is determined under control of the control unit 95; which for this purpose is coupled to the analysis circuit 910, to the driver circuit 98, and to the test signal generator 911, if present, which control unit is loaded with a suitable program or comprises a suitable hardware circuit. Preferably, the optimum setting is determined in a calibration procedure, which is carried out after a record carrier has been inserted in the information recording device.

Further the information recording device has a digital input 96D for receiving digital signals Di in accordance with international Standards or de-facto standards, such as CD-Audio Signals, CD-ROM signals etc. This input 96D is connected directly to the input of driver circuit 98, because the digital signals are alike to the digital recording signal Vop generated by the processing circuit 97.

The digital input signal Di is further read by address reading means 97A, which read the address labels either from the digital main-stream data or from the subcode data and provides the same to the detection means 97B. Upon detection by the detection means 97B of an address label having a zero address value in succession of an address label having a non-zero address value the detection means 97B trigger abortion means 97C, which aborts recording of the digital input signals Di by setting the driver circuit 98 into a non-operative condition. Preferably the means 97A, 97B and 97C and the driver circuit 98 are integrated in a single integrated circuit.

The playback apparatus according to the invention is arranged for retrieving the digital data from the optical disc as described with FIG. 4. Before the user actually is given access to the digital data, a verification process is executed. The presence of at least one of the address labels having said different address value is verified, e.g. by reading the sector of which the address label is known to be different. If the reading response shows an error, the presence of the different address value is detected, and if the respons shows a normal sector, the different address value is absent. The value of the address label may also be verified directly by address reading means arranged for reading the address label, such as described above for the recording apparatus in FIG. 9. In dependence upon the verification the playback of the digital data is aborted, i.e. in the case that one or more of the different address values are absent. Illegal copies of the optical disc may comprise some or all digital data of the sectors having the normal, increasing address values. However the illegal copies will not have the sectors having address labels with said different address values, as such labels cannot be recorded using standard recording equipement. The verification may be a build-in verification procedure in the playback apparatus, e.g. verifying some sectors with fixed addresses. Alternatively the adresses of sectors to be verified may be stored on the optical disc in a normally readable sector. However in a preferred embodiment of the playback apparatus, the verification procedure is part of the digital data stored on the optical disc and is loaded from the optical disc in a programmable part of the playback apparatus when the optical disc is entered in the apparatus. For an optical disc comprising computer software, e.g. a CD-ROM, the verification procedure preferably is an integral part of the computer software the user will activate.

In a further embodiment of the optically readable disc at least one sector is provided with other errors instead of or in addition to said different address value. In a CD the channel code EFM is used as decribed above with FIG. 4. The errors may be effected by modifying the EFM channel bit patterns into non permitted patterns of channel bits or by violating other modulation or error correction rules. For example for EFM a minimum (d) and maximum (k) number of channel bit periodes between each transition of logical value is given, the so called d,k constraint. If the d,k constraint is violated, the EFM decoder certainly will report errors. A reading device will produce an read error message when reading such a sector having errors, and a standard recording device cannot record such errors. In a preferred embodiment the sectors comprising other errors are arranged adjoining sectors having only the different address value, as it will be difficult to detect which are the sectors having the different address values and which are the sectors comprising the other errors, as the reading will be influenced by the combined effects of the adjoining sectors.

A malicious party faces various difficulties in creating an operative illegal copy. The playback apparatus is not able to read the sectors having said different address values and/or the sectors comprising the other errors, and will generate read errors. A recording apparatus may be forced by the malicious party to replace such sectors by dummy sectors. However a standard recording apparatus cannot create the different address values or the other errors, while in operation the absence thereof will be detected on the playback apparatus. Modifying the standard recording device to create said different address values is difficult. Modifying the standard recording device even further to create the other errors is even more difficult. Therefore in practical circumstances an operative copy cannot be made.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. An optically readable disc for storing digital data thereon arranged in successive sectors, each sector being a unit of organization of the digital data and being addressable via an address label stored with said sector; wherein:

the address labels have address values which increase by a preset increment for each successive sector except for one or more marked address labels, a marked address label having an address value which departs from said preset incremental increase with respect to the address value of the preceding address label; and the presence of at least one of said marked address labels signified that said disc is not available for copying.

2. An optically readable disc as claimed in claim 1, wherein the digital data comprises digital mainstream data and digital subcode data, and the marked address labels are included in the digital subcode data.

3. An optically readable disc as claimed in claim 1, wherein the marked address labels are in a sector containing informationless data.

4. An optically readable disc as claimed in claim 1, wherein the marked address labels each have an address value of zero.

5. An optically readable disc as claimed in claim 1, wherein a plurality of successive sectors have marked address labels.

6. An optically readable disc as claimed in claim 1, wherein the sectors are in a program area on said disc which starts with a pregap comprising sectors having informationless data, and at least one of said marked address labels is in said pregap.

7. An optically readable disc as claimed in claim 1, wherein the sectors are in a program area on said disc which is preceded by a lead-in area and succeeded by a lead-out area, and at least one of said marked address labels is in either or both of the lead-in and lead-out areas.

8. An optically readable disc as claimed in claim 1, wherein at least one of said marked address labels precedes or follows a sector in which copy-protected information is stored.

9. An optically readable disc as claimed in claim 1, wherein the digital data is stored on said disc in accordance with predetermined modulation and error correction rules, and at least one sector is erroneous in that the stored data therein comprises at least one error in the form of a violation of said rules; whereby a disc lacking said erroneous sector is thereby identified as a fraudulent copy of an original disc.

10. An optical disc recording apparatus for recording digital data on an optically readable disc, the digital data being arranged in successive sectors each of which is addressable by an address label stored therewith; the address labels having address values which increase by a preset increment for each successive sector except for one or more marked address labels, a marked address label having an address value which departs from said preset incremental increase with respect to the address value of the preceding address label; said recording apparatus comprising:

read means for reading the address labels of said sectors;

detection means coupled to said read means for detecting the marked address labels; and abortion means coupled to said detection means for aborting the recording of digital data on said disc upon detection of a marked address label in the digital data.

11. An optical disc playback apparatus for retrieving digital data from an optically readable disc on which it has been recorded, the digital data being arranged in sectors, each sector being addressable by an address label, the address labels having address values which increase by a preset increment with each successive sector except for one or more marked address labels, a marked address label having an address value which departs from said preset incremental increase with respect to the preceding address label; said playback apparatus comprising:

verification means for verifying the presence on said disc of a sector having a marked address label; and abortion means controlled by said verification means for aborting playback of the recorded digital data if said verification of the presence of a marked address label is not obtained.

* * * * *